324-77.    SR 10-19-71    XR    3,614,673

United States Patent

[11] 3,614,673

[72] Inventors George Su Kang
Silver Spring;
Robert Lewis Goodwin, Rockville, both of Md.

[21] Appl. No. 41,363
[22] Filed May 28, 1970
[45] Patented Oct. 19, 1971
[73] Assignee The Bunker-Ramo Corporation
Oak Brook, Ill.

[54] TECHNIQUE FOR UTILIZING A SINGLE PULSE TO SET THE GAINS OF A TRANSVERSAL FILTER
23 Claims, 4 Drawing Figs.

[52] U.S. Cl. .......... 333/18, 328/151, 328/167, 324/77 E, 333/28 R, 333/70 T
[51] Int. Cl. .......... H04b 3/04
[50] Field of Search .......... 333/18, 28 R, 70 T

[56] References Cited

UNITED STATES PATENTS

| | | | |
|---|---|---|---|
| 3,289,108 | 11/1966 | Davey et al. | 333/18 |
| 3,375,473 | 3/1968 | Lucky | 333/18 |

*Primary Examiner*—Herman Karl Saalbach
*Assistant Examiner*—Paul L. Gensler
*Attorney*—Frederick M. Arbuckle

ABSTRACT: A system for utilizing a single pulse having initially known characteristics to set the tap weights of a transversal filter to convert a first time function applied to the filter input into a second time function at the filter output. The pulse as it appears at the system input is converted into a first representation in the frequency domain and is mathematically operated upon, in conjunction with a generated second representation in the frequency domain of the pulse as it is desired that it appear at the output from the filter, to generate the frequency domain transfer function of the transversal filter. This transfer function is then converted into the time domain inpulse response of the filter which may be directly utilized to form the desired set of weighting factors for the transversal filter.

When the first time function is a signal received over a transmission media, the system may function as a media equalizer.

INVENTOR.
GEORGE S. KANG
ROBERT L. GOODWIN
BY
Ronald J. Kransdorf

TECHNIQUE FOR UTILIZING A SINGLE PULSE TO SET THE GAINS OF A TRANSVERSAL FILTER

This invention relates to a technique for utilizing a single pulse having initially known characteristics to set the tap weights of a transversal filter to convert a first time function applied to the filter input into a desired second time function at the filter output and more particularly to a transmission medium equalizer system which requires only a single test pulse to set the equalizer to perform the equalization function.

A transversal filter consists in essence of a tapped delay line the tap outputs of which are multiplied by a set of weights and then summed. For some years it has been known that by controlling the weight by which each tap output is multiplied, the transversal filter may be utilized to realize a large class of linear transmission characteristics. This capability of a transversal filter has, for example, been used in line equalizers to compensate for the distortion introduced into the signal by a transmission media such as a telephone line.

If the distortion characteristics of the media are known and remain fairly stable, then it is a relatively simple matter to set the tap weights or gains of the transversal filter. However, in most instances, these distortion characteristics may vary with time. In such applications, the weights of the transversal filter have heretofore generally been set by transmitting a test signal of known characteristics through the media and detecting variations between the known initial characteristics of the pulse and the characteristics of the pulse as it emerges from the transversal filter. These variations are utilized to adjust the tap gains. Standard equalization techniques presently in use require a plurality of test pulses to arrive at an optimum tap gain setting for the filter, the top gains being arrived at through an iterative process utilizing a convergence algorithm. While a variety of convergence algorithms are utilized, they all require the repetitive transmission of a test pulse known a priori at the transmitter location. A comparison between the received test pulse and the ideal response is utilized to manipulate the filter gains, generally in fixed increments, so that the desired weight values are reached gradually. While several methods do exist for accelerating the convergence, it is still a relatively time-consuming operation.

It is clear that, while the standard technique is suitable for lines with stable characteristics where the tap gains may be set once and remain set for an indefinite period, a more rapid method of setting the tap gains is required for lines with varying characteristics which must be equalized frequently. The standard technique is, of course, totally unsuitable for equalizing rapidly time-varying media such as are utilized for radio transmission. For such applications the ability to equalize the media in response to the receipt of a single test pulse is either desirable to utilize the channel more efficiently or essential in order to be able to equalize for a burst transmission before changes in the media render the equalization meaningless. The capability of setting the tap gains of a transversal filter in response to the receipt of a single test pulse also permits a transversal filter to be more efficiently utilized to generate an output pulse which is some predetermined function of a received input signal.

It is, therefore, a primary object of this invention to provide an improved technique for setting the gains of a transversal filter to convert a first function applied to the filter into a second function at the filter output.

A more specific object of this invention is to provide a technique for setting the gains of a transversal filter in response to the receipt of a single test pulse.

Another object of this invention is to provide a single pulse media equalizer.

In accordance with the above objects this invention provides a system for utilizing a single test pulse having initially known characteristics to set the weights of a transversal filter to convert a first time function applied to the filter into a desired second time function at the filter output. The test pulse in the form in which it is received by the system is converted into a first representation in the frequency domain by a suitable converting means. A means is provided for also generating a second representation in the frequency domain which is a representation of the test pulse as it should appear in the second time function (i.e., the test pulse as it is desired that it appear at the output from the filter). The first and second representations are applied to a suitable means which utilizes the signals to generate the transfer function of the transversal filter. The frequency domain transfer function is then applied to a means for converting it into the time domain impulse response of the transversal filter which impulse response may be applied directly to set the weights of the transversal filter.

In the preferred embodiment of the invention, the transversal filter is utilized as part of a line equalizer with the first representation being that of the frequency spectrum of the distorted pulse which has passed through the transmission media and the second representation being that of the frequency spectrum of the original test pulse in its undistorted form.

The foregoing and other objects, features and advantages of the invention will be apparent from the following more particular description of preferred embodiments of the invention as illustrated in the accompanying drawings.

IN THE DRAWINGS:

FIG. 1 is a block diagram illustrating the basic elements of the invention.

FIGS. 2A and 2B when combined form a detailed semiblock schematic diagram of a preferred embodiment of the invention.

FIG. 3 is a block diagram of a sample-and-hold circuit suitable for use in the embodiment of the invention shown in FIGS. 2A and 2B.

Referring now to FIG. 1, it is seen that when switch 10 is in its normal position, as shown in the drawing, a time-varying input signal from source 12 on line 14 is applied through line 16 to the delay line input of transversal filter 18. Source 12 may be any desired signal generator or may, for example, be a modem at the receiving end of a telephone line or a radio receiver. Filter 18 may be any one of a number of well-known devices of this type. However, in the discussion to follow, it will be assumed that filter 18 is of the type shown in copending application, Ser. No. 770,169 entitled "Transversal Filter" now U.S. Pat. No. 3,573,623, filed on behalf of J. M. Bannon et al. on Oct. 24, 1968, and assigned to the assignee of the instant application. A filter of this type is shown and described further in connection with FIG. 2B. Transversal filter 18 operates on the signal appearing on line 16 in a predetermined way to generate a time-varying output signal on line 20.

So long as no change is desired in the tap gains of filter 18, switch 10 remains in the position shown. However, when an adjustment is desired, switch 10 is transferred to apply the signal on line 14 to line 22. The system operation is such that, just after switch 10 is transferred, a test pulse having known characteristics is generated. In application where the source 12 is at the receiving end of a transmission media, the test pulse on line 14 will differ from the originally generated pulse due to distortion in the media. The test pulse is applied to a circuit 30 which transforms the time-domain input pulse on line 22 into an output signal on line 32 which is a representation of the input pulse in the frequency domain. While a variety of time-to-frequency domain transformation circuits might be utilized for the circuit 30, in preferred embodiments of the invention, circuit 30 is a Fourier transform circuit the output of which is the frequency spectrum of the input signal. A single-pulse spectrum analyzer (SIPSAN) suitable for use as the circuit 30 is shown in copending application Ser. No. 68,861 filed Sept. 2, 1970, which application is a continuation-in-part of Ser. No. 799,067 entitled "Spectrum Analyzer" filed Feb. 13, 1968 on behalf of G. S. Kang and assigned to the assignee of the instant application. The SIPSAN is shown in FIG. 2A and is described in greater detail later. From this description, it will be seen that the output from the SIPSAN is actually a time-varying signal which represents the frequency spectrum of the input pulse.

Since the test pulse which appears on line 14 had known characteristics when it was originally generated, the frequency spectrum of this known, desired, pulse may be easily derived. A reference function generator 34 is provided for generating on line 36 the desired frequency spectrum.

From previous discussion it is apparent that the signals on lines 32 and 36 are to be utilized to derive the frequency response or transfer function of the transversal filter 18. An arithmetic circuit 38 is provided for generating this transfer function. While the details of the hardware in circuit 38 will be described later an understanding of the function performed by this circuit can be obtained if it is realized that the frequency domain equation for this circuit is:

$$E_d(w)=E_A H_t(w) \qquad (1)$$

where: $E_d(w)$=the frequency spectrum of the desired signal which is specified by the application (i.e., the signal on line 36)

$E_A(w)$=the frequency spectrum of the signal actually received (i.e., the signal on line 32), and $H_t(w)$=the frequency response of the transversal filter.

Solving equation (1) for $H_t(w)$ gives:

$$H_t(w)=E_d(w)/E_A(w) \qquad (2)$$

If it is realized that $E_A(w)$ and $E_d(w)$ are both complex quantities then $E_A(w)$ and $E_d(w)$ may be written as:

$$E_A(w)=Re[E_A(w)]+Im[E_A(w)]=A+jB \qquad (3)$$

$$E_d(w)=Re[E_d(w)]+jIm[E_d(w)]=C+jD \qquad (4)$$

When equations (3) and (4) are substituted in equation (2) and the equations are expanded, the transfer function of the transversal filter is expressed as:

$$\begin{aligned} H_t(w) &= \frac{E_d(w)}{E_A(w)} \\ &= \frac{ReE_d(w)+jIm[E_d(w)]}{ReE_A(w)+jIm[E_A(w)]} \\ &= \frac{ReE_d(w)Re[E_A(w)]+Im[E_d(w)]Im[E_A(w)]}{(Re[E_A(w)])^2+(Im[E_A(w)])^2} \\ &\quad +j\frac{Re[E_A(w)]Im[E_d(w)]-Re[E_d(w)]Im[E_A(w)]}{(Re[E_A(w)])^2+(Im[E_A(w)])^2} \\ &= \frac{AC+BD}{A^2+B^2}+j\frac{AD-CB}{A^2+B^2} \end{aligned} \qquad (5)$$

As will be seen later, equation (5) may be utilized to define the circuit elements required in arithmetic unit 38.

The frequency domain transfer function on output line 40 from unit 38 is converted back into a time-domain function in transfer-function-to-impulse-response generator 42. As will be seen later, circuit 42 performs the inverse transform of circuit 30. Since, in general, the poles of $H_t(w)$ are in both sides of the complex plane, the impulse response must be computed for both $t \geq 0$ and $t<0$. Circuitry suitable for obtaining the transversal filter impulse response from its transfer function is shown in FIG. 2B and described in detail later. The output from generator 42 on line 44 is sampled at the Nyquist rate with the succeeding samples being stored and utilized to set the gains for succeeding taps of the transversal filter. When all of the tap gains have been set, switch 10 may be transferred to its normal position as shown in FIG. 1 to permit information on line 14 to be applied through transversal filter 18.

A circuit has thus been provided which permits the tap gains of a transversal filter to be set in response to the receipt of a single pulse by converting the pulse from the time domain to the frequency domain, performing the required arithmetical operations in the frequency domain to obtain the transversal filter transfer function, converting the transfer function back into a time domain impulse response, and utilizing samples from the impulse response to set the filter gains.

DETAILED DESCRIPTION OF PREFERRED EMBODIMENT

Figure 1:
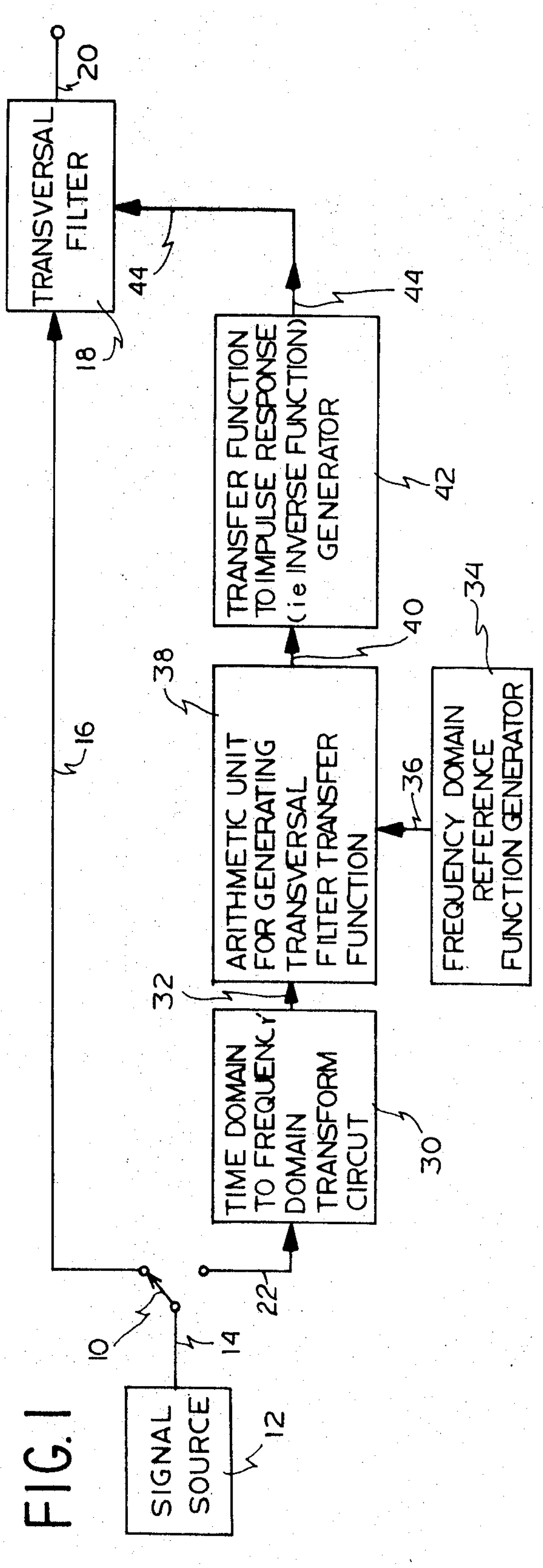
Figure 2A:
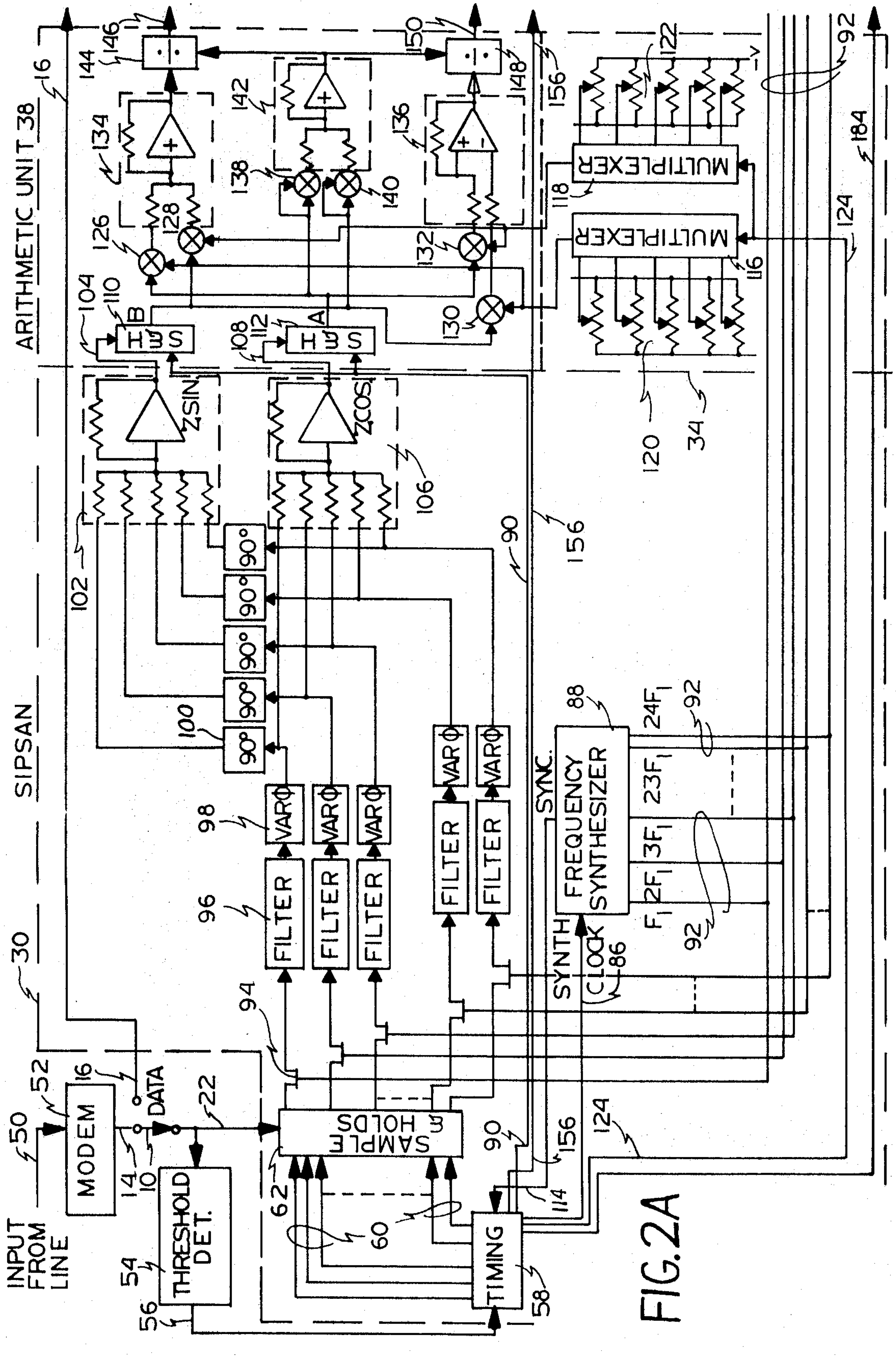
Figure 2B:
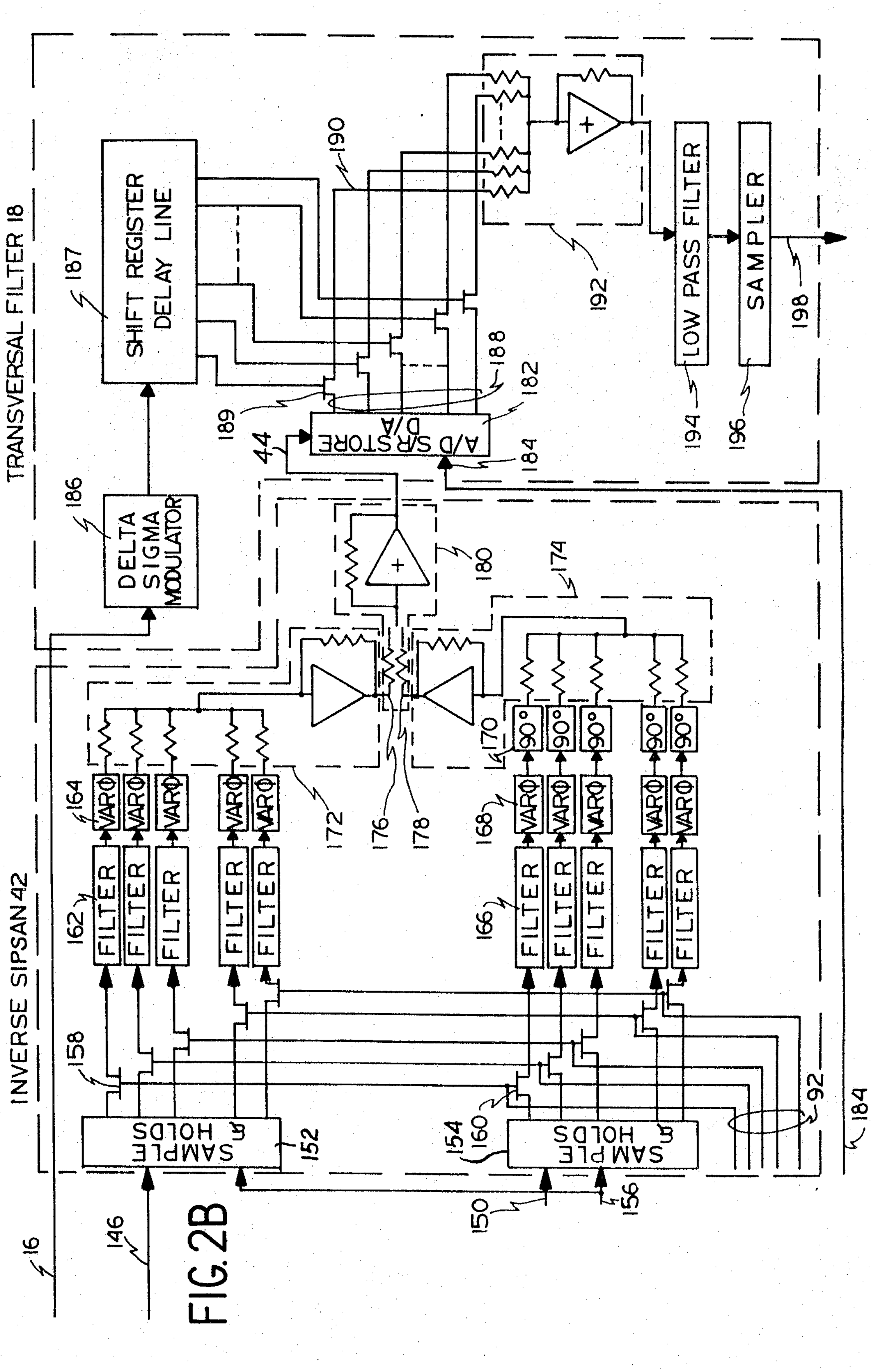

FIGS. 2A and 2B combines to form a schematic diagram of a single pulse equalization circuit utilizing the teachings of this invention. For purposes of illustration, it will be assumed that the signal to be equalized is derived from a telephone line 50 (FIG. 2A). The signals on line 50 are applied through a modulator-demodulator (modem) 52 to circuit input line 14. Line 14 and other elements which are common to both FIG. 1 and FIGS. 2A and 2B bear the same reference numeral in both figures. Signals on line 14 are applied through a switch 10 to either data line 16 leading to transversal filter 18 or to line 22 leading to the equalizer circuit.

Assume initially that switch 10 is in the position shown in FIG. 2A causing a test pulse on line 50 to be applied through line 22 to the equalization circuit. A threshold circuit 54 is provided to detect when the received test pulse on line 22 reaches a predetermined level. When this level is reached, circuit 54 generates an output on line 56 which is applied to start the cycle of timing circuit 58.

Timing circuit 58 initially generates a sample control pulse which is applied in succession to each of the lines 60. This may be accomplished by storing a pulse in a shift register in response to the signal on line 56 and stepping the pulse through the shift register at the desired rate. Each line 60 is connected as a conditioning input to a sample-and-hold device 62 in single-pulse spectrum analyzer (SIPSAN) 30. Thus, each time the timing pulse appears on a line 60, the analogue value of the received pulse which is then appearing on line 22 is stored in the corresponding sample-and-hold circuit. It has been determined that in order to fully specify a received pulse, the pulse must be sampled at the Nyquist rate of the input line 50. The Nyquist rate is equal to ½*w* where *w* is the bandwidth of the input line 50. Thus, the number of sample-and-hold circuits 62 required will depend both on the bandwidth of the input line and on the anticipated duration of the distorted reference pulse. For typical applications 20 to 30 sample-and-hold circuits would be required. Thus, for a 2.4 kb/S data rate on the transmission line and an anticipated maximum duration of the actual line output of 5 msec., 24 samples would be required.

Figure 3:
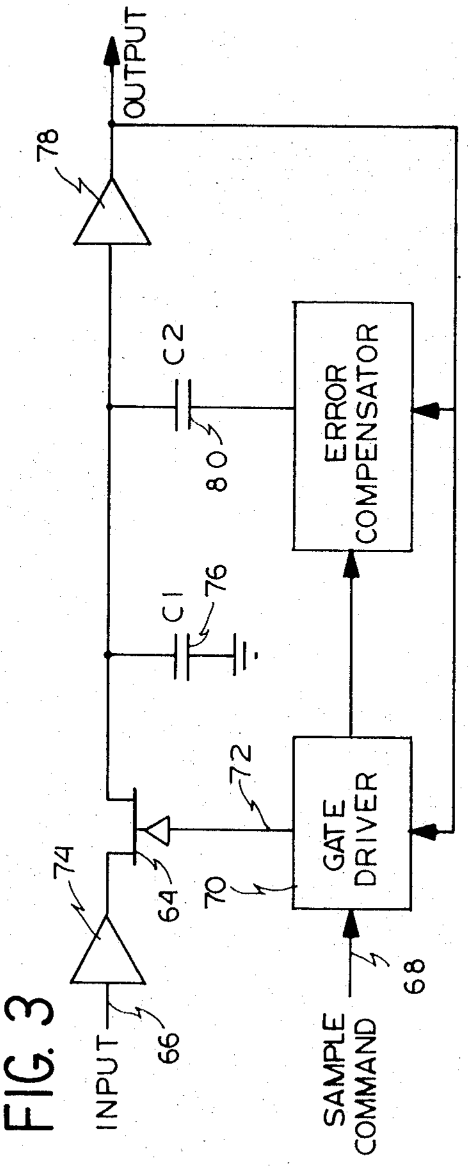

FIG. 3 is a schematic diagram of a single sample-and-hold circuit suitable for use in this invention. Field effect transistor (FET) 64 is normally biased to nonconduction preventing an input value on line 66 from being stored in the circuit. When a sample command is received on line 68, a gate driver 70 generates an output on line 72 which turns transistor 64 on. This permits the application of the input value then appearing on line 66 through low-impedance driver amplifier 74, and the low impedance of transistor 64, to drive hold-capacitor 76. When gate driver 70 turns off transistor 64, capacitor 76 maintains the sample voltage for readout by amplifier 78. The small charge remaining on the capacitor 76 is removed by the gate-source capacity of the FET which creates an error in the readout. This error is removed by error correction capacitor 80.

The SIPSAN circuit 30 is described in detail in the before-mentioned Kang patent application, Ser. No. 68,861. However, the operation of this circuit will be briefly described again at this point. When the sampling operation has been completed, timing circuit 58 generates an output on line 86 which is applied to start frequency synthesizer 88. At the same time timing circuit 58 conditions itself to generate a series of sample-and-hold condition pulses on line 90. Frequency synthesizer 88 generates pulse trains the width and frequency of which correspond to half cycles of a fundamental frequency wave F1 and subharmonics of F1, the number of subharmonics being equal to the number of samples stored in sample-and-hold circuit 62. Each output line 92 from frequency synthesizer 88 is connected to turn on a corresponding field effect transistor 94 the input to which is the analogue value stored in a corresponding sample-and-hold circuit 62. The outputs from the FET's 94 are thus a series of square waves of successively increasing frequency, the peak amplitude of each of which is a linear function of the output level of the corresponding sample-and-hold circuit 62 and the phase of which is shifted 180°. This square wave is converted into a cosine wave by a band-pass filter 96 which rejects the harmonic content of the square wave and passes only the fundamental frequency. Since each filter introduces a phase shift of about −135°, each is followed by a −45° phase shifter 98 to provide a 180° phase shift with respect to the corresponding FET output. The combined phase shifts of the output cosine wave equals 360°, thus eliminating timing errors by phasing all signals with respect to the fundamental frequency F1. Sine signals are derived by passing each cosine signal through a 90° phase shifter 100. The modulated sine wave outputs from phase shifters 100 are summed in summing amplifier circuit 102 to generate on line 104 a signal which, for purposes of this invention, will be considered to be the imaginary part of the pulse's Fourier spectrum. The cosine outputs from variable phase shift circuit 98 are summed in summing amplifier 106 to generate a signal on line 108 which is the real part of the pulse's Fourier spectrum.

After allowing a sufficient time for the filters 96 to settle (i.e., for example 2.5 msec.) timing circuit 58 starts to generate on lines 90 a series of sample pulses to sample-and-hold circuits 110 and 112. A sync pulse on line 114 from frequency synthesizer 88 assures that the sampling will be begin at the start of a fundamental frequency waveform. Sample-and-hold circuits 110 receive the imaginary part of the SIPSAN output on line 104 and sample-and-hold circuits 112 receive the real part of the output on line 108. The sampling rate is again equal to the Nyquist rate or, in other words, is equal to the converse of twice the highest frequency component of the SIPSAN output. The value, and thus the sampling rate for circuits 110 and 112, will depend on the fundamental frequency F1 selected, which frequency is not critical, and on the number of samples which are used in the SIPSAN. The clock rate of the timing pulse generator in circuit 58 is adjusted to provide a higher sampling rate on lines 90 than the rate originally required on lines 60.

Equation (5) indicates the mathematical relationships in arithmetic unit 38 to obtain the desired filter transfer function. The output from sample-and-hold circuit 112 is the real part of the actual frequency spectrum (A) while the output from sample-and-hold circuit 110 is the imaginary part of the actual frequency spectrum (B). The real and imaginary parts of the desired frequency spectrum (C and D) are synthesized in multiplexers 116 and 118 respectively of reference function generator 34. The waveforms representing C and D are calculated off-line as sample values which are implemented as potentiometer settings 120 and 122 respectively. The analogue voltages from the potentiometer are multiplied sample-by-sample to synthesize the ideal input signal. Each multiplexer consists of a number of electronic switches (for example FET's) equal to the number of sample-and-hold circuits in circuits 110 or 112 (i.e., 24 for the example previously given.) Then switches are energized sequentially by signals appearing on output lines 124 from timing circuit 58 to allow application of the waveform sample values to arithmetic unit 38 in the proper order. The multiplexer conditioning signals on lines 124 may be generated at the same rate as that at which sample-control pulses are applied to lines 90 but should be delayed slightly from the corresponding pulses on these lines to permit the sampled values to be stored in the appropriate sample-and-hold circuit before attempting to utilize them.

Since multiplication in arithmetic unit 38 is performed only on sample values rather than on continuous signals, the performance requirements on the six multiplier circuits utilized are significantly reduced. From FIG. A it is seen that circuit 38 is merely a hardware implementation of equation 5. Multiplier 126 forms the product (AC), multiplier 128 forms the product (BD), multiplier 130 forms the product (BC), and multiplier 132 forms the product (AD). The outputs from multipliers 126 and 128 are summed in summing amplifier circuit 134 to form the numerator for the real part of equation (5), and the outputs from multipliers 130 and 132 are negatively summed or subtracted in summing amplifier circuit 136 to form the numerator of the imaginary part of this equation. The quantity $A^2$ is formed in multiplier 138 and the quantity $B^2$ in multiplier 140. The outputs from these two multipliers are summed in summing amplifier 142 to form the denominator of the real and imaginary parts of equation (5). The output of summing circuit 134 is divided by the output from summing circuit 142 in division circuit 144 to form the real-part output of the desired transfer function on line 146, while the output from summing circuit 136 is divided by the output from summing circuit 142 in division circuit 148 to provide the imaginary portion of the desired transfer function of line 150. It will be remembered that the arithmetic operation described above are performed on pairs of samples from sample-and-hold circuits 110 and 112 and multiplexers 116 and 118. The outputs on lines 146 and 150 are thus also sample values which are supplied to sample-and-hold circuits 152 and 154 of inverse SIPSAN circuit 42. In order to provide for the storage of the samples appearing on lines 146 and 150, timing circuit 58 applies timing pulses to lines 156 in synchronism with the application of pulses to lines 124 but slightly delayed in order to permit time for the arithmetic operations in circuit 38 to be completed.

The inverse Fourier transform in circuit 42 is performed by a process similar to that utilized for the direct Fourier transform in circuit 30. The 24 real and 24 imaginary value samples stored in sample-and-hold circuits 152 and 154 respectively modulate (i.e., control the amplitude of) the harmonically related square waves derived from frequency synthesizer 88. The modulation is performed in sets of FET's 158 and 160. As with SIPSAN circuit 30, the outputs from FET's 158 are passed through filters 162 and variable phase shift circuits 164 to obtain modulated cosine waves which are properly phase related to the input. Modulated sine waves for the imaginary part of the input are obtained by passing the outputs from FET's 160 through filters 166, variable phase shift circuits 168, and 90° phase shifters 170. It should be noted, however, that since each cosine frequency component has a different weighting from its respective sine frequency component, the sine waveform is not just the quadrature component of the cosine summation waveform as it was in SIPSAN circuit 30 (i.e., knowing one summation waveform, the other cannot be derived from it). The cosine waveforms for the real part of the input are summed with a positive sign in summing amplifier 172 and the sine waveforms forms for the imaginary part of the input are summed (with a negative sign) in summing amplifier circuit 174. The resulting outputs on lines 176 and 178 are effectively subtracted by being summed in summing amplifier circuit 180. The resulting impulse response on line 44 is applied to transversal filter circuit 18.

The impulse response on line 44 is applied to a sample-and-store circuit 182 in transversal filter circuit 18. If the data transmission period which is to be equalized by the transversal filter does not exceed 200 msec., analogue sample-and-hold circuits such as are used in circuits 62, 110 etc. and are shown in FIG. 3 may be utilized. However, if the input signals being utilized have a greater data transmission period, then a digital data storage technique should be employed. When using such a technique, only a single timing pulse line 184 from timing circuit 58 is required. As before, the sampling rate will be the Nyquist rate for the frequency content of the waveform being sampled, in this case the transversal filter impulse response.

Each time a pulse appears on line 184, a gate is opened permitting the analogue value of the impulse response at that instant to be applied to an analogue-to-digital converter. A plurality of shift registers are provided with each digital output from the A to D converter being stored in succeeding shift registers. The number of bit positions in each shift register will depend on the number of digits which are to be used in the weights. Four bits usually provide the required precision. The bit values stored in each shift register are weighted and summed in a binary resistor summer to obtain an analogue voltage weight value for each transversal filter delay line tap.

At this point an apparent anomaly which arises in the setting of transversal filter tap gains with a single test pulse should be mentioned. The compensation which is introduced by an initial set of tap gains causes an equal but opposite compensation to be introduced on a pulse in imaginary time (i.e., in time prior to the time $t$=0at which sampling and compensation begin). The reason for this is that, as mentioned previously, the inverse Fourier transform for $H_t(w)$ must be carried out for $t \geqq 0$ and $t<0$, since $H_t(w)$, in general, contains poles in both sides of the complex plane. The equalized output will be delayed in time in comparison with the arrival time of the actual line response caused by the test pulse.

While this equal but opposite compensation causes no problem with the test pulse itself, it does cause a problem when the equalizer is being used with data on the line. It has been found that, because of the cyclical nature of the signals used to generate the impulse response, the undesired effect of this reflected compensation can be overcome by performing the inverse SIPSAN transformation for a full cycle rather than a half cycle of the fundamental frequency F1 and storing the total number of sample values obtained. There are thus 48 rather than 24 storage positions in sample-and-store circuit 112 and 48 tap positions on delay line 184 of the transversal filter. The extra 24 tap positions are effective to overcome the reflected compensation.

Once the required weight values have been stored in circuit 182, switch 10 (FIG. 2A) may be transferred to permit signals on line 50 to be applied through line 16 to transversal filter 18.

While any standard transversal filter may be used as a transversal filter circuit 18, in a preferred embodiment of the invention the transversal filter utilized is that shown and described in the before-mentioned G. M. Bannon et al. application Ser. No. 770,169, now U.S. Pat. No. 3,573,623. In this filter, analogue input values are sampled and a delta-sigma modulator 186 is utilized to convert each sample into a pulse train, the pulse density of which is proportional to the amplitude of the sample. The output from the delta-sigma modulator is applied to a multiposition shift register 187 which functions as a delay line. Equally spaced taps on this delay line thus have outputs which are either a binary zero or a binary one. Multiplication of delay line outputs by weights may thus be performed by a simple gating operation in FET's 189. If a tap has a binary one on it at a given time, the corresponding FET 189 is conductive, permitting the analogue weight value on the corresponding line 188 to be passed through line 190 to summing amplifier circuit 192. The output from summing circuit 192 is passed through a low-pass filter 194 to recover the equalized data. The equalized data is sampled in sampler 196 at the band rate to produce the transmitted information on equalizer output line 198.

From the above discussion it is apparent that, while in the preferred embodiment of the invention Fourier-transform circuits have been used for the circuits 30 and 42, and the entire system is being utilized for line equalization, the only real limitation on this system is that the time domain to frequency domain transformation in circuit 30 and the frequency domain to time domain transformation in circuit 42 be the inverse of each other. Thus, any circuits capable of performing these transformations may be utilized. Similarly, the arithmetic unit 38 may be configured to perform any desired manipulation on the signals applied thereto. Thus, the system may be utilized to obtain a variety of desired output functions.

It is also apparent that, while special purpose circuits have been shown for performing the transformations and mathematical manipulations, the methods of setting transversal filter tap gains and equalization described above could also be practiced utilizing a programmed general purpose device. While the invention has been particularly shown and described with reference to a preferred embodiment thereof, it will be understood by those skilled in the art that the foregoing and other changes in form and details may be made therein without departing from the spirit and scope of the invention.

What is claimed is:

1. A system for utilizing a single pulse having initially known characteristics to set the tape weights of a transversal filter to convert a first time function applied to the filter input into a second time function at the filter output comprising;

means for generating a first representation in the frequency domain of said pulse, in the form in which it is applied to the system;

means for generating a second representation in the frequency domain of said pulse as it is desired that it appear at the output from said filter;

means responsive to said first and second representations for generating the transfer function of said transversal filter; and means for converting said transfer function into the transversal filter impulse response which is utilized to set said transversal filter weights.

2. A system of the type described in claim 1 wherein said first representation is the frequency spectrum of said pulse as it appears in said first time function; and wherein said second representation is the frequency spectrum of said pulse as it appears when converted into said second time function.

3. A system of the type described in claim 2 wherein said means for generating said first representation is a Fourier transform circuit and wherein said transfer function to impulse response transform means is an inverse Fourier transform circuit.

4. A system of the type described in claim 3 wherein said Fourier transform circuit is a single pulse spectrum analyzer.

5. A system of the type described in claim 3 including means for storing the coefficients of the output from said inverse Fourier transform circuit; and means for applying said stored coefficients to control the weights of said transversal filter.

6. A system of the type described in claim 3 wherein said first representation has a real part A and an imaginary part B;

wherein said second representation has a real part C and an imaginary part D; and wherein said transversal filter transfer function (H) is equal to $$\frac{AC+BD}{A^2+B^2}+j\frac{AD-CB}{A^2+B^2}$$

7. A system of the type described in claim 1 wherein said transfer function has poles on both sides of the complex plane; and wherein the conversion to said impulse response is effectively carried out both for $t \geqq 0$ and $t<0$.

8. A system of the type described in claim 1 wherein said transfer function generating means includes means for mathematically operating on said first and second representations.

9. A system of the type described in claim 1 wherein said single pulse is a test pulse.

10. A system of the type described in claim 1 wherein said first time function and said single pulse are signals received over a distortion introducing media; and wherein said second time function is an equalized form of said first time function.

11. A system of the type described in claim 1 wherein said second representation is the frequency spectrum of said single pulse as it appears when applied to said media.

12. A system for equalizing a signal received over a transmission media comprising:

a transversal filter;

means for normally applying said received signal to said transversal filter;

means operative when a test pulse is received over said transmission media for converting said test pulse into a first representation of said received pulse in the frequency domain;

means for generating a second representation in the frequency domain of said test pulse as it appeared when applied to said transmission media;

means responsive to said representations for generating the transfer function of said transversal filter;

means for converting said transfer function into the transversal filter impulse response; and means for utilizing said impulse response to set the tap gains of said transversal filter to equalize receive signals applied thereto.

13. A system of the type described in claim 12 wherein said representations are the frequency spectrums of the respective pulses.

14. A system of the type described in claim 13 wherein said means for generating said first representation is a Fourier transform circuit and wherein said transfer function to impulse response transform means is an inverse Fourier transform circuit.

15. A system of the type described in claim 14 wherein said Fourier transform circuit is a single pulse spectrum analyzer.

16. A system of the type described in claim 14 including means for storing the coefficients of the output from said inverse Fourier transform circuit; and means for applying said stored coefficients to control the weights of said transversal filter.

17. A system of the type described in claim 13 wherein said first representation has a real part A and imaginary part B;

wherein said second representation has a real part C and an imaginary part D; and wherein said transversal filter transfer function (H) is equal $$\frac{AC+BD}{A^2+B^2}+j\frac{AD-CB}{A^2+B^2}$$

18. A method of utilizing a single pulse having initially known characteristics to set the tap gains of a transversal filter to convert a first time function applied to the filter input into a second time function at the filter output comprising the steps of:

converting said pulse as it is applied to the system into a first representation in the frequency domain;

generating a second representation in the frequency domain, said second representation being a frequency domain representation of said pulse as it is desired that it appear at the output from the filter;

generating from said first and second representations the transfer function of said transversal filter;

converting said transfer function into the transversal filter impulse response; and applying said impulse response to se said transversal filter gains.

19. A method of the type described in claim 18 wherein said first representation is the frequency spectrum of said pulse as it appears in said first time function; and wherein said second representation is the frequency spectrum of said pulse as it appears when converted into said second time function.

20. A method of the type described in claim 19 wherein said first representation has a real part A and an imaginary part B;

wherein said second representation has a real part C and an imaginary part D; and wherein said transversal filter transfer function (H) is equal to $$\frac{AC+BD}{A^2+B^2}+j\frac{AD-CB}{A^2+B^2}$$

21. A method of setting the tap weights of a transversal filter so that the filter will equalize a signal received over a transmission media which is applied thereto comprising the steps of:

applying a test pulse having known characteristics through said transmission media;

converting the received test pulse into first representation in the frequency domain;

generating a second representation in the frequency domain which is a representation in the frequency domain of said test pulse as it appeared when applied to said transmission media;

generating from said first and second representations the transfer function of said transversal filter;

converting said transfer function into said transversal filter impulse response; and applying said impulse response to set said tap weights.

22. A method of the type described in claim 21 wherein said first representation is the frequency spectrum of said pulse as it appears in said first time function; and wherein said second representation is the frequency spectrum of said pulse as it appears when converted into said second time function.

23. A method of the type described in claim 22 wherein said first representation has a real part A and an imaginary part B;

wherein said second representation has a real part C and an imaginary part D; and wherein said transversal filter transfer function (H) is equal to $$\frac{AC+BD}{A^2+B^2}+j\frac{AD-CB}{A^2+B^2}$$